United States Patent
Chien et al.

(10) Patent No.: US 8,233,713 B2
(45) Date of Patent: Jul. 31, 2012

(54) IMAGE PROCESSING METHOD AND IMAGE PROCESSING APPARATUS

(75) Inventors: Hui-Jan Chien, Taipei (TW); Tsai-Hsing Chen, Taipei (TW); Li-Kai Cho, Taipei (TW); Chiung-Sheng Wang, Taipei (TW); Sung-Hui Lin, Taipei (TW)

(73) Assignee: Primax Electronics Ltd., Neihu, Taipei (TW)

( * ) Notice: Subject to any disclaimer, the term of this patent is extended or adjusted under 35 U.S.C. 154(b) by 450 days.

(21) Appl. No.: 12/687,128

(22) Filed: Jan. 14, 2010

(65) Prior Publication Data
US 2011/0116141 A1    May 19, 2011

(30) Foreign Application Priority Data
Nov. 13, 2009   (TW) ................. 98138661 A

(51) Int. Cl.
   *G06K 9/40*      (2006.01)
   *G06K 9/34*      (2006.01)
   *G06K 9/00*      (2006.01)
(52) U.S. Cl. ........................ 382/176; 382/261
(58) Field of Classification Search .......... 382/173, 382/176, 177, 190, 192, 254, 255, 260–264; 358/462
See application file for complete search history.

(56) References Cited

U.S. PATENT DOCUMENTS

| | | | |
|---|---|---|---|
| 5,557,689 A * | 9/1996 | Huttenlocher et al. | 382/177 |
| 5,642,440 A * | 6/1997 | Leib | 382/255 |
| 7,499,588 B2 * | 3/2009 | Jacobs et al. | 382/182 |
| 2007/0292027 A1 * | 12/2007 | Jung et al. | 382/177 |
| 2008/0137954 A1 * | 6/2008 | Tang et al. | 382/176 |
| 2009/0123085 A1 * | 5/2009 | Yoshimura et al. | 382/264 |
| 2011/0116141 A1 * | 5/2011 | Chien et al. | 358/462 |

* cited by examiner

Primary Examiner — Amir Alavi
(74) *Attorney, Agent, or Firm* — Winston Hsu; Scott Margo

(57) ABSTRACT

An image processing method, for receiving an input image and separating pixels having text characteristics and pixels having figure characteristics, includes: applying a first filtering processing for the input image to derive a first image processing result; applying a second filtering processing for the first image processing result to derive a second image processing result, wherein a distribution of filtering parameters of the first filtering processing is different from a distribution of filtering parameters of the second filtering processing; deriving a set of first reference values according to the first image processing result and the second image processing result; and determining whether each pixel within the input image is a text pixel or a figure pixel according to at least the set of the first reference values and a predetermined threshold.

18 Claims, 5 Drawing Sheets

IMAGE PROCESSING METHOD AND IMAGE PROCESSING APPARATUS

BACKGROUND OF THE INVENTION

1. Field of the Invention

The present invention relates to an image processing method and a related apparatus, and more particularly, to an image processing method and a related apparatus capable of separating texts and figures in an input image.

2. Description of the Prior Art

When a scanner captures an image data, if a text part of the image data can be detected and printed with pure black ink while the other parts are processed with other printing settings, not only can a quality and efficiency of the captured image be greatly improved, but also a readability and a clarity of the image data can be enhanced. In addition to adopting edge detection to derive text parts, conventional text/figure separation techniques also utilize chroma detection, screen detection and complicated filters, etc., to rule out a non-text figure part. However, due to the large amount of calculation and hardware involved (such as filters), conventional edge detection techniques are expensive and costly. Therefore, how to separate text and figures in an input image quickly and efficiently is still a major issue in this field.

In addition, due to a limitation of printing hardware, the printed images are usually susceptible to errors and noise from half-tone processing, insufficient resolution, and digitization, leading to issues such as moire patterns, insufficient sharpness at text edges, insufficient dynamic range and high output noise. Therefore, how to solve the aforementioned problems with an easy and economic method is a primary goal in this field.

SUMMARY OF THE INVENTION

In light of this, the present invention provides a method capable of separating text and figure parts in an input image quickly and efficiently that outputs an image of each pixel according to a corresponding text characteristic and a corresponding figure characteristic of the pixel. In this way, not only can clarity of the text part in the input image be preserved, but also a large amount of noise in the figure part of the image input can be avoided.

According to an embodiment of the present invention, an image processing method is provided to receive an input image and separate pixels having text characteristics and pixels having figure characteristics. The image processing comprises: applying a first filtering processing for the input image to derive a first image processing result; applying a second filtering processing for the first image processing result to derive a second image processing result, wherein a distribution of filtering parameters of the first filtering processing is different from a distribution of filtering parameters of the second filtering processing; deriving a set of first reference values according to the first image processing result and the second image processing result; and determining whether each pixel within the input image is a text pixel or a figure pixel according to at least the set of the first reference values and a predetermined threshold.

According to an embodiment of the present invention, an image processing apparatus is provided to receive an input image and separate pixels having text characteristics and pixels having figure characteristics. The image processing apparatus comprises: a first filtering module, a second filtering module, a calculation module and a determining module. The first filtering module applies a first filtering processing for the input image to derive a first image processing result. The second filtering module applies a second filtering processing for the first image processing result to derive a second image processing result, wherein a distribution of filtering parameters of the first filtering processing is different from a distribution of filtering parameters of the second filtering processing. The calculation module is for deriving a set of first reference values according to the first image processing result and the second image processing result. The determining module is for determining whether each pixel within the input image is a text pixel or a figure pixel according to at least the set of the first reference values and a predetermined threshold.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
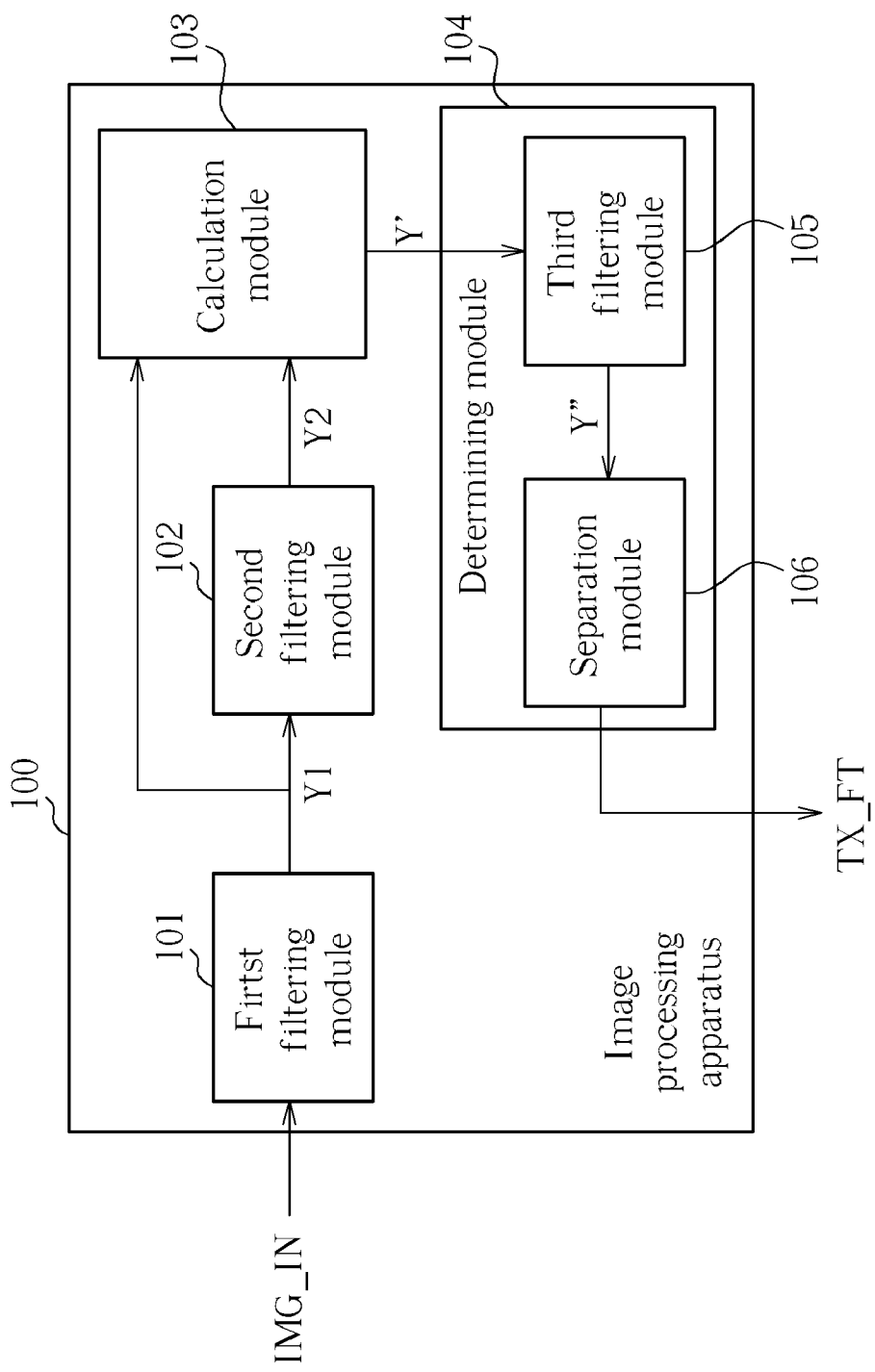
FIG. 1 is an image processing apparatus according to an embodiment of the present invention.

Please refer to FIG. 1, which is an image processing apparatus 100 according to an embodiment of the present invention. The image processing apparatus 100 is for receiving an input image IMG_IN and separating pixels having text characteristics (i.e., text pixels) and pixels having figure characteristics (i.e., figure pixels). The image processing apparatus 100 includes (but is not limited to) a first filtering module 101, a second filtering module 102, a calculation module 103 and a determining module 104, wherein the determining module 104 includes a third filtering module 105 and a separation module 106. The first filtering module 101 applies a first filtering processing for the input image IMG_IN to derive a first image processing result Y1, and the second filtering module 102 which is coupled to the first filtering module 101 applies a second filtering processing for the first image processing result Y1 to derive a second image processing result Y2, wherein a distribution of filtering parameters of the first filtering processing is different from a distribution of filtering parameters of the second filtering processing.

For example, in this embodiment, the first filtering processing is a 7×7 descreen matrix, and a distribution of the descreen matrix can be presented as follows:

$$\begin{bmatrix} -11 & -8 & -6 & -5 & -6 & -8 & -11 \\ -8 & 8 & 12 & 15 & 12 & 8 & -8 \\ -6 & 12 & 15 & 31 & 15 & 12 & -6 \\ -5 & 15 & 31 & 60 & 31 & 15 & -5 \\ -6 & 12 & 15 & 31 & 15 & 12 & -6 \\ -8 & 8 & 12 & 15 & 12 & 8 & -8 \\ -11 & -8 & -6 & -5 & -6 & -8 & -11 \end{bmatrix}$$

Likewise, the second filtering processing is a 7×7 averaging matrix, and a distribution (which is different from the distribution of the descreen matrix) of the averaging matrix can be presented as follows:

$$\begin{bmatrix} 1 & 1 & 1 & 1 & 1 & 1 & 1 \\ 1 & 1 & 1 & 1 & 1 & 1 & 1 \\ 1 & 1 & 1 & 1 & 1 & 1 & 1 \\ 1 & 1 & 1 & 1 & 1 & 1 & 1 \\ 1 & 1 & 1 & 1 & 1 & 1 & 1 \\ 1 & 1 & 1 & 1 & 1 & 1 & 1 \\ 1 & 1 & 1 & 1 & 1 & 1 & 1 \end{bmatrix}$$

From the diagram above, it can be seen that the descreen matrix includes a plurality of entries, where a center entry of the descreen matrix has a filtering parameter maximum value (i.e., 60 in the center), edge entries and internal entries of the descreen matrix are different in sign, the edge entries are all negative and the internal entries are all positive, and each entry in a direction from the center entry to each edge entry has a filtering parameter whose magnitude increases with a decreasing distance between the entry and the center entry. However, the aforementioned matrix is only an embodiment of the present invention and is not supposed to be a limitation of the present invention; for example, the size of both matrixes is not necessarily identical, and is not limited to 7×7 symmetric matrixes. 5×5 or 7×5 matrixes can also be adopted according to different requirements.

In this embodiment, the image processing apparatus 100 processes a luminance value of each pixel in the input image IMG_IN after receiving the input image IMG_IN. Firstly, the first filtering module 101 will apply the aforementioned descreen matrix to filter the luminance value of each pixel to establish a first image processing result Y1. For those skilled in this field, it should be obvious that the distribution of the filtering parameter of the descreen matrix is for low-pass filtering to enhance the center of the matrix, and eliminating influence from a half-tone noise on the input image while partially preserving high-frequency components. Compared with conventional edge detection filtering matrix, the descreen matrix in this invention can derive the text characteristic parts (high frequency components) more effectively and eliminate half-tone noise of low frequency at the same time. The second filtering module 102 then applies the averaging matrix to collect an average luminance value of pixels within a predetermined range of each pixel in the first image processing result Y1, thereby blurring luminance information of each pixel in the first image processing result Y1. Next, the calculation module 103 will derive a set of first reference values Y' according to an absolute value of a difference between a first luminance value of each pixel in the first image processing result Y1 and a second luminance value of a corresponding pixel located at an identical position in the second image processing result Y2. i.e., Y'=|Y1−Y2|. The set of first reference values Y' indicates an extent of the text characteristic of each pixel in the input image IMG_IN.

Figure 2:
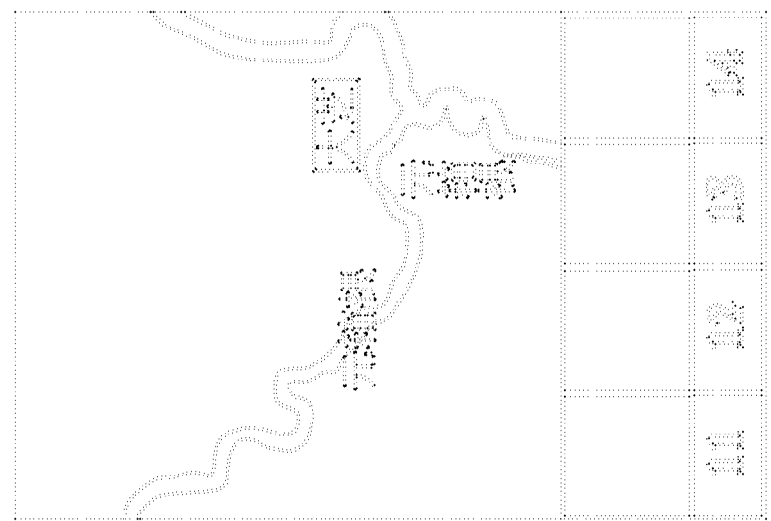
FIG. 2 is a diagram of a third filtering module receiving a set of first reference values to regenerate a corresponding set of second reference values.
Figure 2:
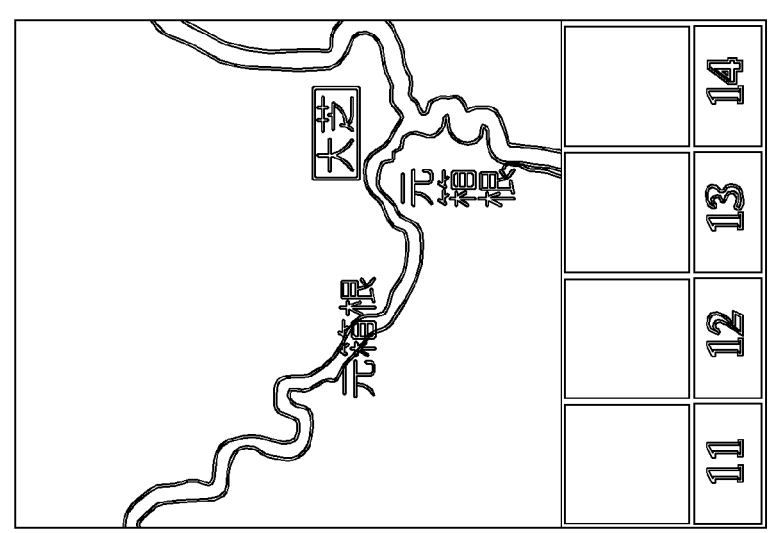

The determining module 104 is coupled to the calculation module 103, and is for determining whether each pixel within the input image IMG_IN is a text pixel Pixel_T or a figure pixel Pixel_F according to at least the set of the first reference values Y' and a predetermined threshold TH0. Since a processing of human eyes converting received information into visual form is very close to a low-pass filtering processing, the present invention further processes the set of first reference values Y' to derive a better visual effect. The third filtering module 105 (e.g., a Gaussian filter) applies a matrix of Gaussian distribution to process the set of first reference values Y'. Please refer to FIG. 2, which is a diagram of the third filtering module 105 in FIG. 1 receiving the set of first reference values Y' to regenerate a corresponding set of second reference values Y''. In FIG. 2, the third filtering module 105 converts the sharper first reference values Y' into the smoother second reference values Y''. Finally, the separation module 104 will determine whether each pixel within the input image IMG_IN is a text pixel or a figure pixel according to the set of the second reference values Y'' and the predetermined threshold TH0 and generate a text/figure separation result TX_FT.

Figure 3:
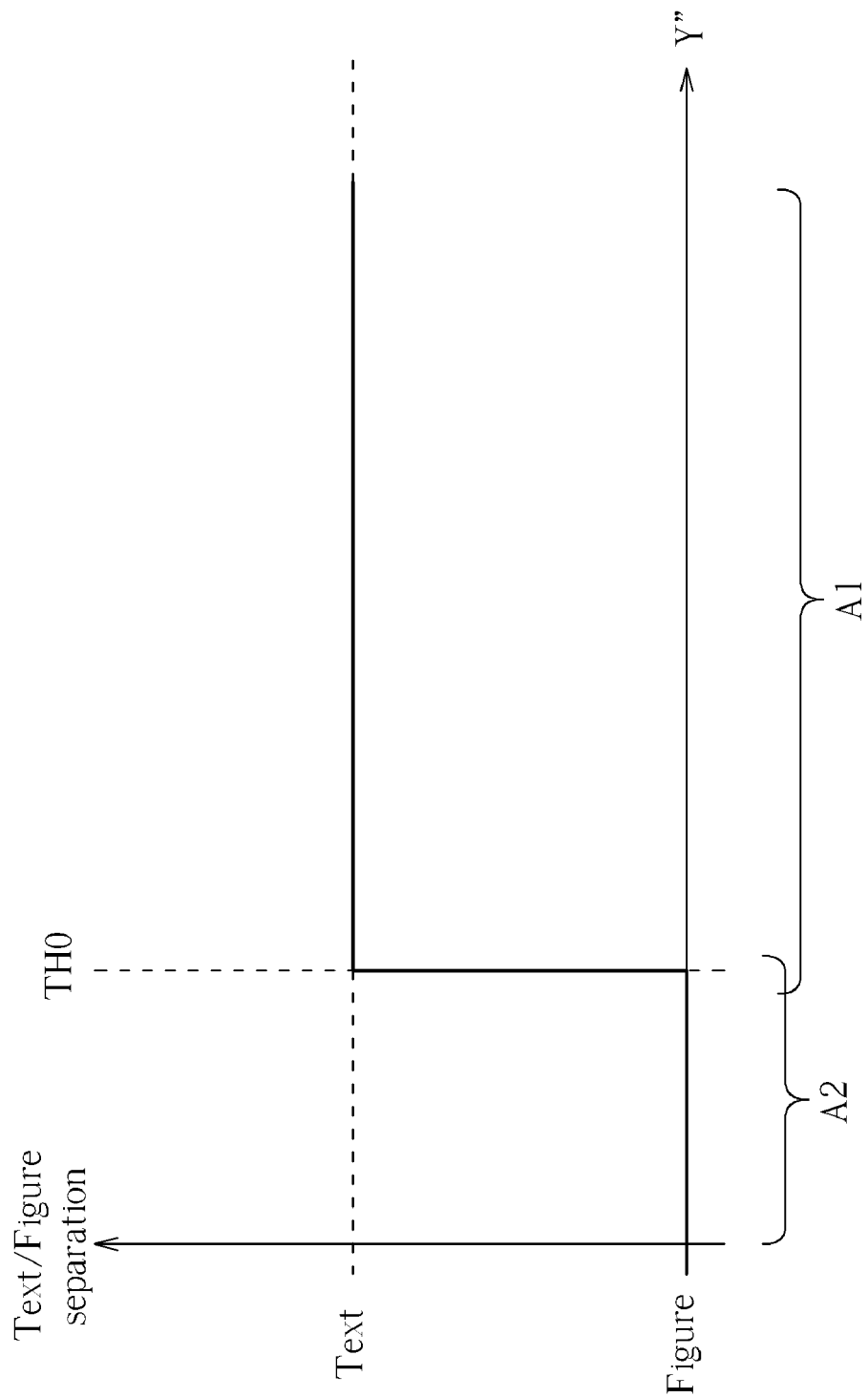
FIG. 3 is a diagram of a separation module shown in FIG. 1 determining a text pixel or a figure pixel according to a predetermined threshold.

Please refer to FIG. 3, which is a diagram of the separation module 106 in FIG. 1 determining a text pixel or a figure pixel according to a predetermined threshold TH0. As shown in the figure, the separation module 106 will determine each pixel is a text pixel or a figure pixel according to whether the second reference value Y'' corresponding to the pixel exceeds the predetermined threshold TH0 or not. Those pixels having corresponding second reference values Y'' exceeding the predetermined threshold TH0 are substantially categorized into a first area A1. The first area A1 indicates that the pixel has characteristics including text, line or high extent of edge; and those pixels having corresponding second reference values Y'' less than the predetermined threshold TH0 are substantially categorized into a second area A2. The second area A2 indicates that the pixel has characteristics including contone, half tone, background or low extent of edge.

Figure 4:
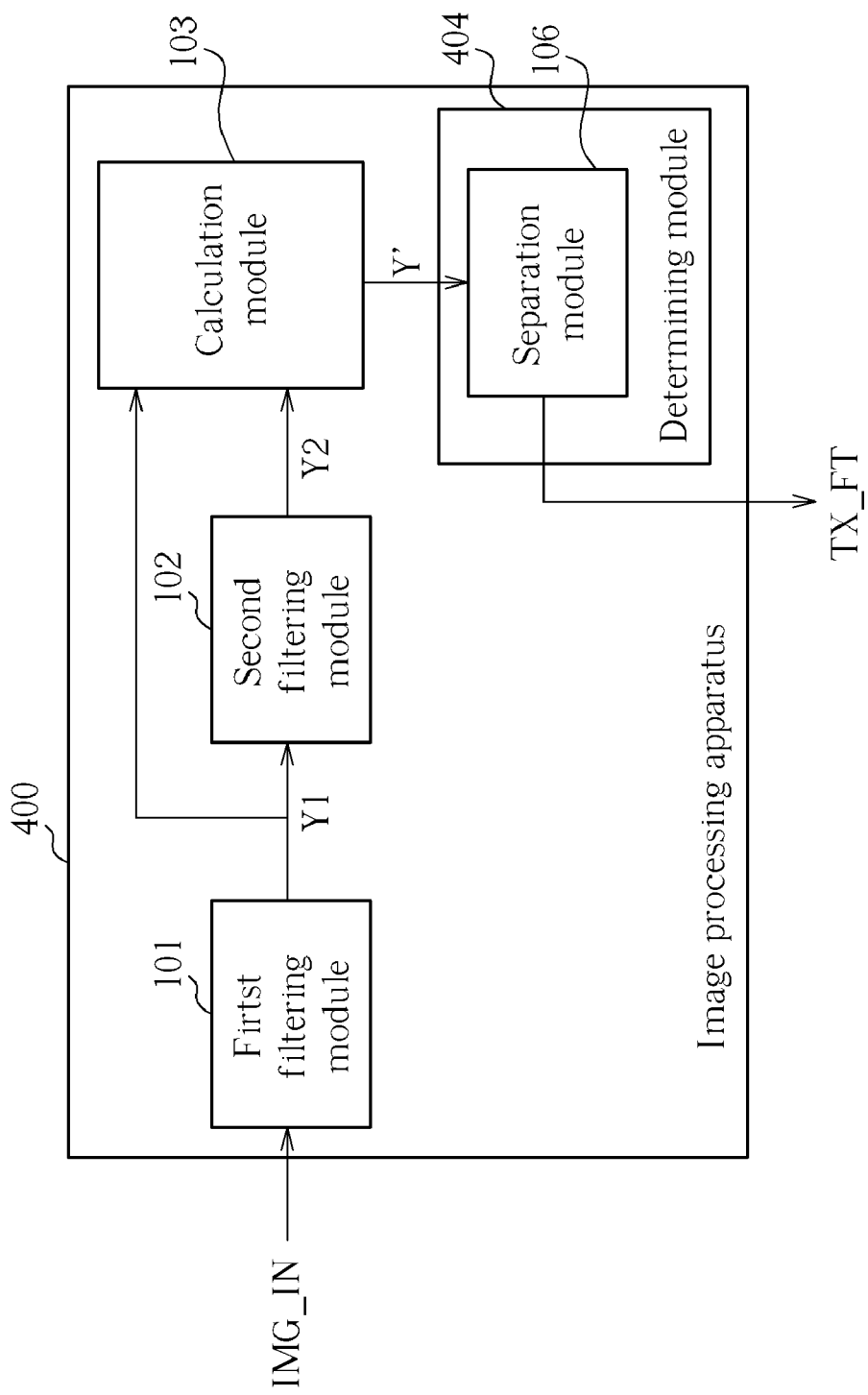
FIG. 4 is an image processing apparatus according to another embodiment of the present invention.

The aforementioned apparatus is only a preferred embodiment of the present invention, and is not supposed to be a limitation of the present invention. For example, the matrix utilized by the third filtering module 105 is not necessarily limited to a Gaussian distribution; other matrixes having low-pass characteristics can also be adopted here, and the third filtering module 105 is also not a necessary element in the present invention. Please refer to FIG. 4, which is an image processing apparatus 400 according to another embodiment of the present invention. The determining module 404 of the image processing apparatus 400 does not have the third filtering module 105 shown in FIG. 1 and directly processes the set first reference values Y' via the separation module 106. This kind of variation in design still falls within the scope of the present invention.

Figure 5:
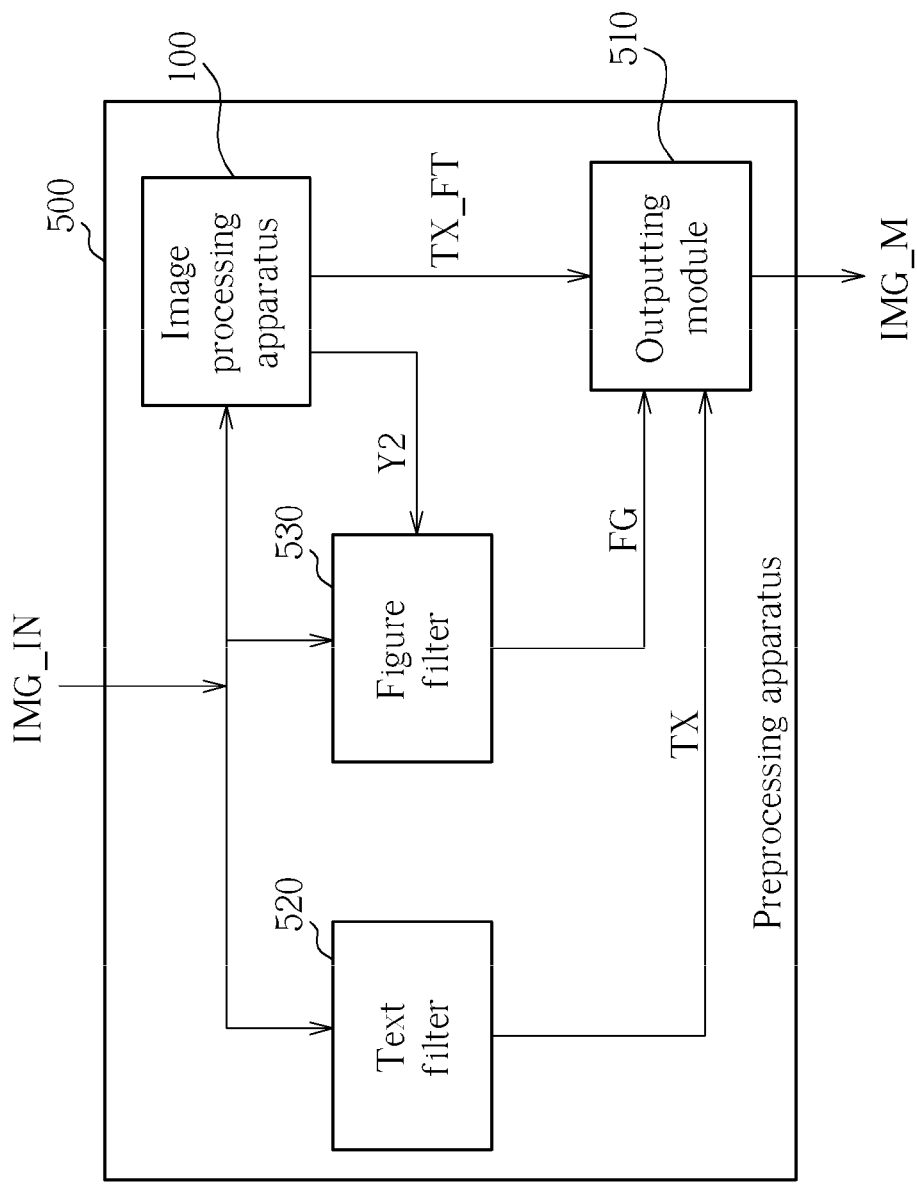
FIG. 5 is a system block diagram of a preprocessing apparatus according to an embodiment of the present invention.

In addition, the present invention further provides an image processing apparatus (e.g., the preprocessing apparatus 500 described as follows) including an outputting module, wherein the outputting module processes each pixel within an input image IMG_IN to output a text data or a figure data corresponding to the pixel according to whether the pixel is a text pixel or a figure pixel (i.e. the text/figure separation result TX_FT), respectively. In this way, the aforementioned text/figure separation result TX_FT can be utilized to derive a better output performance efficiently. Please refer to FIG. 5, which is a system block diagram of a preprocessing apparatus 500 according to an embodiment of the present invention. The preprocessing apparatus 500 applies a processing result of the image processing apparatus 100 in FIG. 1 to output a processed image IMG_M. The preprocessing apparatus comprises (but is not limited to) the image processing apparatus 100, an outputting apparatus 510, a text filter 520 and a figure filter 530. The text filter 520 in the preprocessing apparatus 500 (which can also be viewed as an image processing apparatus) will receive the input image IMG_IN and apply a text filtering for luminance data of each pixel in the input image IMG_IN, and finally outputs a text data TX according to a result of the text filtering and chroma information of each pixel in the input image IMG_IN. When a pixel in the input image IMG_IN is determined as a text pixel (e.g., Pixel_T) by the image processing apparatus 100, the outputting module 510 therefore outputs the text data TX corresponding to the pixel. Likewise, the figure filter 530 will receive the input image IMG_IN and apply a figure filtering for chroma data of each pixel in the input image IMG_IN, and finally outputs a figure data FG according to a result of the figure filtering and the second image processing result Y2 generated from the image processing apparatus 100 to output a figure data FG, wherein the figure data FG includes luminance data generated from the second image processing result Y2 and chroma data generated from the figure filtering processing result. When a pixel in the input image IMG_IN is determined as a figure pixel (e.g., Pixel_F) by the image processing apparatus 100, the outputting module 510 therefore outputs the figure data FG corresponding to the pixel.

The aforementioned apparatus is only a preferred embodiment of the present invention, and is not supposed to be a limitation of the present invention. For example, the figure data FG and the text data TX adopted by the outputting module 510 can be generated from the other image processing methods according to different applications; in other words, as long as an image processing apparatus outputs different data according to a difference of text/figure separation, this modification is within the scope of the present invention. In addition, the image processing apparatus 100 of the preprocessing apparatus 500 in FIG. 5 can also be implemented by the image processing apparatus 400 in FIG. 4. This kind of variation in design also complies with the spirit of the present invention.

In summary, the present invention provides a method and a related apparatus capable of separating figure parts and text part in an input image, setting and outputting corresponding images according to a text characteristic and a figure characteristic of each pixel in the input image. In this way, not only can clarity of text in the input image be preserved, but also an influence of halftone and other noise on the figure part of the input image can be eliminated, leading to an enhancement of the visual performance Those skilled in the art will readily observe that numerous modifications and alterations of the device and method may be made while retaining the teachings of the invention.

What is claimed is:

1. An image processing method, for receiving an input image and separating pixels having text characteristics and pixels having figure characteristics, comprising:
   applying a first filtering processing for the input image to derive a first image processing result;
   applying a second filtering processing for the first image processing result to derive a second image processing result, wherein a distribution of filtering parameters of the first filtering processing is different from a distribution of filtering parameters of the second filtering processing;
   deriving a set of first reference values according to the first image processing result and the second image processing result; and
   determining whether each pixel within the input image is a text pixel or a figure pixel according to at least the set of the first reference values and a predetermined threshold.

2. The image processing method of claim 1, wherein the step of determining whether each pixel within the input image is a text pixel or a figure pixel according to at least the set of the first reference values and a predetermined threshold comprises:
   applying a third filtering processing for the set of first reference values to derive a set of second reference values, wherein a distribution of filtering parameters of the third filtering processing is different from a distribution of filtering parameters of the first filtering processing and the second filtering processing; and
   determining whether each pixel within the input image is a text pixel or a figure pixel according to at least the set of the second reference values and the predetermined threshold.

3. The image processing method of claim 2, wherein the distribution of filtering parameters of the third filtering processing is a Gaussian distribution.

4. The image processing method of claim 1, wherein the set of first reference values is determined from a difference between a first luminance value of each pixel in the first image processing result and a second luminance value of a corresponding pixel located at an identical position in the second image processing result.

5. The image processing method of claim 1, wherein the second filtering processing is an average filtering processing.

6. The image processing method of claim 1, wherein the distribution of filtering parameters of the first filtering processing forms a matrix, the matrix comprises a plurality of entries, a center entry of the matrix has a filtering parameter maximum value, edge entries and internal entries of the matrix are different in sign, and each entry in a direction from the center entry to each edge entry has a filtering parameter whose magnitude increases with a decreasing distance between the entry and the center entry.

7. The image processing method of claim 1, further comprising:
   for each pixel within the input image:
      outputting a text data or a figure data corresponding to the pixel according to whether the pixel is a text pixel or a figure pixel.

8. The image processing method of claim 7, wherein the text data is generated from the input image via a text filtering processing.

9. The image processing method of claim 7, wherein the figure data comprises a luminance data and a chroma data, the luminance data is generated according to the second image processing result, and the chroma data is generated from the input image via a figure filtering processing.

10. An image processing apparatus, for receiving an input image and separating pixels having text characteristics and pixels having figure characteristics, comprising:
   a first filtering module, for applying a first filtering processing for the input image to derive a first image processing result;
   a second filtering module, coupled to the first filtering module, for applying a second filtering processing for the first image processing result to derive a second image processing result, wherein a distribution of filtering parameters of the first filtering processing is different from a distribution of filtering parameters of the second filtering processing;
   a calculation module, coupled to the first filtering module and the second filtering module, for deriving a set of first reference values according to the first image processing result and the second image processing result; and
   a determining module, coupled to the calculation module, for determining whether each pixel within the input image is a text pixel or a figure pixel according to at least the set of the first reference values and a predetermined threshold.

11. The image processing apparatus of claim 10, wherein the determining module comprises:

a third filtering module, coupled to the calculation module, for applying a third filtering processing for the set of first reference values to derive a set of second reference values, wherein a distribution of filtering parameters of the third filtering processing is different from a distribution of filtering parameters of the first filtering processing and the second filtering processing; and a separation module, coupled to the third filtering module, for determining whether each pixel within the input image is a text pixel or a figure pixel according to at least the set of the second reference values and the predetermined threshold.

12. The image processing apparatus of claim 11, wherein the third filtering module is a Gaussian filter.

13. The image processing apparatus of claim 10, wherein the set of first reference values are determined from a difference between a first luminance value of each pixel in the first image processing result and a second luminance value of a corresponding pixel located at an identical position in the second image processing result.

14. The image processing apparatus of claim 10, wherein the second filtering module is an averaging filter.

15. The image processing apparatus of claim 10, wherein the distribution of filtering parameters of the first filtering processing forms a matrix, the matrix comprises a plurality of entries, a center entry of the matrix has a filtering parameter maximum value, edge entries and internal entries of the matrix are different in sign, and each entry in a direction from the center entry to each edge entry has a filtering parameter whose magnitude increases with a decreasing distance between the entry and the center entry.

16. The image processing apparatus of claim 10, further comprising:

an outputting module, coupled to the input image and the determining module, for processing each pixel within the input image to output a text data or a figure data corresponding to the pixel according to whether the pixel is a text pixel or a figure pixel.

17. The image processing apparatus of claim 16, wherein the text data is generated from the input image via a text filtering processing.

18. The image processing apparatus of claim 16, wherein the figure data comprises a luminance data and a chroma data, the luminance data is generated according to the second image processing result, and the chroma data is generated from the input image via a figure filtering processing.

* * * * *